US005759630A

United States Patent [19]
Vosskuhl et al.

[11] Patent Number: 5,759,630
[45] Date of Patent: Jun. 2, 1998

[54] PROCESS FOR THE PRODUCTION OF TEXTURED COATINGS ON PLASTICS SURFACES

[75] Inventors: Annegret Vosskuhl, Haltern, Germany; Bernhard Rubbert, Farmington-Hills, Mich.

[73] Assignee: BASF Lacke + Farben, AG, Muenster-Hiltrup, Germany

[21] Appl. No.: 553,405

[22] PCT Filed: May 17, 1994

[86] PCT No.: PCT/EP94/01590

§ 371 Date: Jan. 11, 1996

§ 102(e) Date: Jan. 11, 1996

[87] PCT Pub. No.: WO94/28045

PCT Pub. Date: Dec. 8, 1994

[30] Foreign Application Priority Data

May 28, 1993 [DE] Germany ............................ 43 17 784.0

[51] Int. Cl.[6] .................... B05D 3/02; C08F 8/30; C08F 8/00; C08L 75/00
[52] U.S. Cl. ........................... 427/393.5; 427/372.2; 427/385.5; 525/123; 525/131; 525/455
[58] Field of Search ................. 427/372.2, 385.5, 427/393.5; 525/123, 131, 455

[56] References Cited

U.S. PATENT DOCUMENTS

| 4,108,840 | 8/1978 | Friedlander | 528/46 |
| 4,555,535 | 11/1985 | Bednarek et al. | |
| 4,578,426 | 3/1986 | Lenz et al. | 525/131 |
| 5,322,897 | 6/1994 | Jung et al. | 525/123 |

FOREIGN PATENT DOCUMENTS

| 0 129 813 | 6/1984 | European Pat. Off. | C09D 3/80 |
| 2021 178 | 3/1969 | Germany | C09D 3/00 |

*Primary Examiner*—Patrick D. Niland

[57] ABSTRACT

The present invention relates to a process for the production of textured coatings on plastics surfaces using coating compositions based on hydroxyl group-containing binders and polyisocyanates, and using pulverulent texturing agents.

The process is characterized in that, initially, a solution of the hydroxyl group-containing binder (I) is mixed with an elastic matting paste (A) comprising a1) from 12 to 25% by weight of a saturated hydroxyl group-containing polyester having a hydroxyl number of from 100 to 160 mg of KOH/g and a number-average molecular weight of from 800 to 2500, a2) from 1 to 4% by weight of a hydroxyl group-containing Cardura-modified acrylate copolymer having a hydroxyl number of from 30 to 250 mg of KOH/g and an acid number of from 0 to 50 mg of KOH/g, a3) from 0 to 3% by weight of cellulose ester, a4) from 35 to 60% by weight of organic solvent, a5) from 12 to 25% by weight of matting agents and if desired catalysts, wetting agents and, if desired, other auxiliaries and additives, the total weight of the elastic matting paste (A) being in each case 100% by weight, the elastic matting paste (A) being sieved if desired before or after being mixed with the solution of the hydroxyl group-containing binder (I), the mixture is subsequently mixed together with polyisocyanates (II) as crosslinking agents, other organic solvents if desired and with the pulverulent texturing agent, the resulting coating composition is applied to the plastics substrate, and the coating is dried.

9 Claims, No Drawings

PROCESS FOR THE PRODUCTION OF TEXTURED COATINGS ON PLASTICS SURFACES

This application is a 371 of PCT/EP94/01590 filed May 17, 1994.

The present invention relates to a process for the production of textured coatings on plastics surfaces, using coating compositions based on hydroxyl group-containing binders and polyisocyanates as crosslinking agents and using pulverulent texturing agents.

Plastics surfaces, for example car bumpers, are often coated with texturing, matting coatings, in order to obtain textured plastics surfaces. It is known to employ coating compositions containing organic solvents and based on hydroxyl group-containing binders and polyisocyanates, which contain additives in paste form, containing pulverulent texturing agents, and matting agents in order to obtain textured surfaces of plastics components on cars, especially for refinishing. The texturing agent employed in this context is, for example, ground polypropylene. The matting agent used is, for example, silicic acid. With the aid of the matting agent, the coating composition intended for the textured surface is adjusted to the degree of gloss of the plastics surface. To ensure good adhesion to the plastics substrate, elasticized binders are employed.

However, the problem which occurs with the previously known texturing coating compositions for plastics components on cars is that dried-on particles can fall back into the paint from the can edge of the respective containers and, as so-called bittiness, can interfere with processing and lead to paint defects. It is not possible to sieve off these dried-on product particles before processing, i.e. before the application of the coating compositions, since otherwise the pulverulent texturing agent would also be removed.

The object of the present invention was therefore to avoid the above-described disadvantages of the previously known texturing coating compositions. The intention was to provide a process for the production of textured coatings on plastics surfaces, especially for refinishing, using coating compositions based on hydroxyl group-containing binders and polyisocyanates, this process being intended to enable the sieve removal, shortly before application, of any dried product particles formed. The coating compositions used in the process were to contain pulverulent texturing agents and the matting agents required to adjust the desired degree of gloss. In addition, the process was to enable trouble-free incorporation of the pulverulent texturing agents into the plastics-coating compositions.

The object of the present invention is surprisingly achieved by a process for the production of textured coatings on plastics surfaces, using coating compositions based on hydroxyl group-containing binders and polyisocyanates as crosslinking agents, and using pulverulent texturing agents. The process according to the invention is characterized in that, initially, a solution of the hydroxyl group-containing binder (I) is mixed with an elastic matting paste (A) comprising a1) from 12 to 25% by weight, preferably from 16 to 21% by weight, of a saturated hydroxyl group-containing polyester having a hydroxyl number of from 100 to 160 mg of KOH/g and a number-average molecular weight of from 800 to 2500, a2) from 1 to 4% by weight, preferably from 1.8 to 2.6% by weight, of a hydroxyl group-containing Cardura-modified acrylate copolymer having a hydroxyl number of from 30 to 250 mg of KOH/g and an acid number of from 0 to 50 mg of KOH/g, a3) from 0 to 3% by weight of cellulose ester, a4) from 35 to 60% by weight, preferably from 45 to 55% by weight, of organic solvent, a5) from 12 to 25% by weight, preferably from 15 to 22% by weight, of matting agents and if desired catalysts, wetting agents and, if desired, other auxiliaries and additives, the total weight of the elastic matting paste (A) being in each case 100% by weight, the elastic matting paste (A) being sieved if desired before or after being mixed with the solution of the hydroxyl group-containing binder (I), the mixture is subsequently mixed together with polyisocyanates (II) as crosslinking agents, other organic solvents if desired and with the pulverulent texturing agent, the resulting coating composition is applied to the plastics substrate, and the coating is dried.

Suitable hydroxyl group-containing binders (I) include both resins produced by addition polymerization and those produced by condensation polymerization. Particularly preferred resins are hydroxyl group-containing polyacrylate resins having OH numbers of from 30 to 250 mg of KOH/g and acid numbers of from 0 to 50 mg of KOH/g. The number-average molecular weights of the preferred hydroxyl group-containing polyacrylates are conventionally between 1,000 and 10,000, in each case measured by GPC against a polystyrene standard. The hydroxyl groups are introduced into the polyacrylate resin by using monomers which contain hydroxyl groups. Generally from 20 to 60% by weight, based in each case on the overall weight of the monomers employed, of at least one hydroxyl group-containing, ethylenically unsaturated monomer are employed. Suitable hydroxyl group-containing, ethylenically unsaturated monomers are hydroxyalkyl esters of $\alpha,\beta$-unsaturated carboxylic acids containing primary or secondary-hydroxyl groups. Examples of suitable hydroxyalkyl esters of $\alpha,\beta$-unsaturated carboxylic acids containing primary hydroxyl groups are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of hydroxyalkyl esters which can be used and which have a secondary hydroxyl group are 2-hydroxypropyl acrylate, 2-hydroxybutyl acrylate, 3-hydroxybutyl acrylate and the corresponding methacrylates. It is of course also possible in each case to employ the corresponding esters of other $\alpha,\beta$-unsaturated carboxylic acids, for example of crotonic acid and of isocrotonic acid. The hydroxyl group-containing monomer may be, at least in part, a reaction product of one mole of hydroxyethyl acrylate and/or hydroxyethyl methacrylate and on average 2 mol of $\epsilon$-caprolacton. Furthermore, the hydroxyl group-containing monomer employed may also, at least in part, be a reaction product of acrylic acid and/or methacrylic acid with the equivalent amount of a glycidyl ester of a carboxylic acid having a tertiary $\alpha$ carbon atom. Examples of other suitable comonomers are aromatic vinyl compounds, for example styrene, vinyltoluenes, $\alpha$-methylstyrene, chlorostyrenes, o-, m- or p-methylstyrene, 2,5-dimethylstyrene, p-methoxystyrene, p-tert-butyl-styrene, p-dimethylaminostyrene, p-acetamidostyrene and m-vinylphenol. Also suitable are other ethylenically unsaturated, copolymerizable monomers, for example alkyl esters of olefinically unsaturated carboxylic acids. Examples of these are methyl (meth)acrylate, ethyl (meth)acrylate, butyl (meth)acrylate, isopropyl (meth)acrylate, isobutyl (meth)acrylate, pentyl (meth)acrylate, isoamyl (meth)acrylate, hexyl (meth)acrylate, cyclohexyl (meth)acrylate, 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, and octadecenyl (meth)acrylate and the corresponding esters of maleic, crotonic, isocrotonic, vinylacetic and itaconic acid. Other suitable ethylenically unsaturated comonomers are alkoxyethyl acrylates, aryloxyethyl acrylates and the corresponding methacrylates. In order to improve the compatibility, it is also possible to copolymerize small quantities of carboxyl group-containing monomers. Examples of suitable carboxyl group-containing monomers are unsaturated carboxylic acids, for example acrylic acid, methacrylic acid, itaconic acid, crotonic acid and half-esters of maleic and fumaric acid. The polymerization of the monomer components is carried out in the presence of organic solvents with the exclusion of oxygen, for example by operating under a nitrogen atmosphere. The polymerization reaction is carried out at temperatures of from about 100° to 180° C., using appropriate polymerization initiators and—if desired—polymerization regulators. The polymerization is preferably carried out in high-boiling organic solvents which are inert with respect to the monomers employed.

As hydroxyl group-containing binders (I) it is particularly preferred to employ acrylate copolymers having a hydroxyl number of from 30 to 250 mg of KOH/g which are obtainable by copolymerization of (Ia) Hydroxyalkyl esters of $\alpha,\beta$-ethylenically unsaturated carboxylic acids, (Ib) if desired, vinyl esters of monocarboxylic acids, (Ic) if desired, ethylenically unsaturated carboxylic acids, and (Id) other ethylenically unsaturated monomers, where component (Ia) employed comprises, at least in part, reaction products of acrylic acid and/or methacrylic acid with the glycidyl ester of a carboxylic acid having a tertiary $\alpha$ carbon atom. Examples of the hydroxyalkyl esters of $\alpha,\beta$-ethylenically unsaturated carboxylic acids have already been described above.

In this context, component (Ia) used comprises, at least in part, reaction products of acrylic acid and/or methacrylic acid with the equivalent quantity of a glycidyl ester of a carboxylic acid having a tertiary $\alpha,\beta$ carbon atom. Glycidyl esters of highly branched monocarboxylic acids are available under the tradename "Cardura". The acrylic acid or methacrylic acid can be reacted with the glycidyl ester of a carboxylic acid having a tertiary $\alpha$ carbon atom before, during or after the polymerization reaction.

If desired, it is possible to employ vinyl esters of monocarboxylic acids as comonomers (component Ib). Here it is preferable to employ vinyl esters of $\alpha$-branched monocarboxylic acids having from 5 to 15 carbon atoms per molecule. Of particular preference, moreover, is the vinyl ester of p-tert-butylbenzoic acid. Examples of other suitable vinyl esters are vinyl acetate and vinyl propionate.

Examples of suitable components (Ic) and (Id) have already been described above.

Suitable hydroxyl group-containing binders (I) are, in addition, polyesters which contain hydroxyl groups. Also suitable are polyester-modified polyacrylates, for example those described in DE-A-40 24 204.

Examples of suitable polyisocyanates (II) are:

Aromatic isocyanates, for example 2,4- and 2,6-tolylene diisocyanate and mixtures thereof, 4,4'-diphenylmethane diisocyanate, m-phenylene, p-phenylene, 4,4-biphenyl, 1,5-naphthalene, 1,4-naphthalene, 4,4-toluidine and xylylene diisocyanate, and substituted aromatic systems, for example dianisidine diisocyanates, 4,4-diphenyl ether diisocyanates or chlorodiphenylene diisocyanates, and more highly functional aromatic isocyanates, for example 1,3,5-triisocyanatobenzene, 4,4',4"-triisocyanatotriphenylmethane, 2,4,6-triisocyanatotoluene and 4,4'-diphenyldimethylmethane 2,2', 5,5'-tetraisocyanate; cycloaliphatic isocyanates, for example 1,3-cyclopentane, 1,4-cyclohexane, 1,2-cyclohexane and isophorone diisocyanate; aliphatic isocyanates, for example trimethylene, tetramethylene, pentamethylene, hexamethylene and trimethylhexamethylene 1,6-diisocyanate and trishexamethylene triisocyanate. It is preferred to employ diisocyanates having isocyanate groups of differing reactivity, for example isophorone diisocyanate. Also suitable are isocyanate prepolymers of relatively high molecular mass. Compounds which can be mentioned in this context are adducts of tolylene diisocyanate and trimethylol propane, a biuret formed from 3 molecules of hexamethylene diisocyanate, and the trimers of hexamethylene diisocyanate and of 3,5,5-trimethyl-1-isocyanato-3-isocyanatomethylcyclohexane.

The quantity of crosslinking agent employed here is chosen so that the ratio of the isocyanate groups of component (II) to the sum of the hydroxyl groups of the coating composition is in the range from 1:3 to 3:1.

The coating compositions contain one or more organic solvents. These solvents are conventionally employed in quantities of from 20 to 65% by weight, based in each case on the overall weight of the coating composition. Examples of suitable solvents are relatively highly substituted aromatics, for example solvent naphtha, heavy benzene, various Solvesso grades, various Shellsol grades and Deasol, and relatively high-boiling aliphatic and cycloaliphatic hydrocarbons, for example various white spirits, mineral oil of turpentine, tetralin and decalin and various esters, for example ethylglycol acetate, butylglycol acetate, ethyldiglycol acetate and the like.

In accordance with the process according to the invention, a solution of the hydroxyl group-containing binder (I) is initially mixed with an elastic matting paste (A); the elastic matting paste (A), if necessary, being sieved before or after being mixed with the binder solution. In some cases the sieving procedure can of course be dispensed with, if there are no dried interfering particles.

As component a1), this matting paste contains from 12 to 25% by weight, preferably from 16 to 21% by weight, of a saturated, hydroxyl group-containing polyester having a hydroxyl number of from 100 to 160 mg of KOH/g and a number-average molecular weight of from 800 to 2,500. The branching of the polyester should amount to from 0.2 to 0.6 mol/kg. These polyesters are tough, flexible polyester grades. For the preparation of the polyesters, it is preferred to employ aromatic polycarboxylic acids in combination with aliphatic polycarboxylic acids. Examples are phthalic acid, isophthalic acid, terephthalic acid, halophthalic acids such as tetrachloro- or tetrabromophthalic acid, adipic acid, glutaric acid, azelaic acid, sebacic acid, fumaric acid, maleic acid, trimellitic acid, pyrromellitic acid and the like.

Also suitable are the esterifiable derivatives of the above-mentioned polycarboxylic acids, for example their mono- or polyesters with aliphatic alcohols having from 1 to 4 carbon atoms or hydroxy alcohols having from 1 to 4 carbon atoms. In addition, it is also possible to employ the anhydrides of the abovementioned acids, where these exist. If desired, cycloaliphatic carboxylic acids can also be employed.

Together with the polycarboxylic acids, it is also possible to employ monocarboxylic acids such as, for example, benzoic acid, tert-butylbenzoic acid, lauric acid, isononanoic acid and fatty acids of naturally occurring oils.

Suitable alcohol components for the preparation of the hydroxyl group-containing polyesters are polyhydric alcohols such as ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethyolpropane, glycerol, pentaerythritol, dipentaerythritol, trishydroxyethyl isocyanurate, polyethylene glycol and polypropylene glycol, together if desired with monohydric alcohols. It is preferred to employ linear long-chain polyols, for example hexane-1,6-diol. As a more highly functional alcohol, trimethylolpropane is preferably used.

The acid number of the hydroxyl group-containing polyesters should not be greater than 5 mg of KOH/g.

The hydroxyl group-containing polyesters are prepared by the known methods of esterification, for example as described in Ullmann's Enzyklopädie der technischen Chemie [Ullmann's Encyclopedia of Industrial Chemistry], volume 14, pages 80 to 106 (1963).

This reaction is usually carried out at temperatures of between 180° and 280° C., in the presence if desired of a suitable esterification catalyst. Conventionally, the polyesters are prepared in the presence of small quantities of a suitable solvent as entraining agent.

As component a2), the matting paste (A) contains from 1 to 4% by weight, preferably from 1.8 to 2.6% by weight, of a Cardura-modified acrylate copolymer which contains hydroxyl groups and has a hydroxyl number of from 30 to 250 mg of KOH/g and an acid number of from 0 to 50 mg of KOH/g. The hydroxyl groups are incorporated into the Cardura-modified acrylate resin by using hydroxyl group-containing monomers. It is usual to employ from 20 to 60% by weight, based in each case on the overall weight of the monomers employed, of at least one hydroxyl group-containing ethylenically unsaturated monomer.

Suitable hydroxyl group-containing monomers are hydroxyalkyl esters of α,β-ethylenically unsaturated carboxylic acids containing primary or secondary hydroxyl groups. It is of course also possible to use mixtures of hydroxyalkyl esters containing primary and secondary hydroxyl groups. Examples of suitable hydroxyalkyl esters of α,β-ethylenically unsaturated carboxylic acids, containing primary hydroxyl groups, are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples which may be mentioned of hydroxyalkyl esters which contain a secondary hydroxyl group and which it is possible to use are 2-hydroxypropyl acrylate, 2-hydroxybutyl acrylate, 3-hydroxybutyl acrylate and the corresponding methacrylates.

It is of course also possible to employ in each case the corresponding esters of other α,β-ethylenically unsaturated carboxylic acids, for example those of crotonic acid and of isocrotonic acid. Component a2) is a Cardura-modified acrylate copolymer, i.e. the hydroxyl group-containing monomer employed at least in part is a reaction product of acrylic acid and/or methacrylic acid with the equivalent amount of a glycidyl ester of a carboxylic acid having a tertiary α carbon atom. These glycidyl esters of highly branched monocarboxylic acids are available under the tradename "Cardura". The reaction of the acrylic acid or methacrylic acid with the glycidyl ester of a carboxylic acid having a tertiary α carbon atom may be carried out before, during or after the polymerization.

Other suitable comonomers for the preparation of the Cardura-modified acrylate copolymers are:

aromatic vinyl compounds, for example styrene, vinyltoluenes, α-methylstyrene, chlorostyrenes, o-, m- and p-methylstyrene, 2,5-dimethylstyrene, p-methoxystyrene, p-tert-butylstyrene, p-dimethylaminostyrene, p-acetamidostyrene and m-vinylphenol; alkyl esters of olefinically unsaturated carboxylic acids, such as methyl (meth)acrylate, ethyl (meth)acrylate, butyl (meth)acrylate, isopropyl (meth) acrylate, isobutyl (meth)acrylate, pentyl (meth) acrylate, isoamyl (meth)acrylate, hexyl (meth)acrylate, cyclohexyl (meth)acrylate, 2-ethylhexyl (meth) acrylate, octyl (meth)acrylate, 3,5,5-trimethylhexyl (meth)acrylate, decyl (meth)acrylate, dodecyl (meth) acrylate, hexadecyl (meth)acrylate, octadecyl (meth) acrylate, octadecenyl (meth)acrylate and the corresponding esters of maleic, crotonic, isocrotonic, vinyl acetic and itaconic acid; alkoxyethyl acrylates, aryloxyethyl acrylates and the corresponding methacrylates, for example butoxyethyl (meth)acrylate and phenoxyethyl (meth)acrylate; carboxyl group-containing monomers, for example acrylic acid, methacrylic acid, itaconic acid, crotonic acid and half-esters of maleic and fumaric acid; unsaturated compounds containing tertiary amino groups, for example 2-vinylpyridine, vinylpyrroline, vinylquinoline, vinylisoquinoline, N,N'-dimethylaminoethyl vinyl ether and 2-methyl-5-vinylpyridine.

The hydroxyl group-containing, Cardura-modified polyacrylates are generally produced by solution polymerization. Such processes are known in the literature and described, for example, earlier in this application.

The matting paste (A) contains from 0 to 3% by weight of a cellulose ester (component a3)). Examples of suitable cellulose esters are cellulose nitrate and cellulose esters of organic acids such as acetic acid, propionic acid and butyric acid, with cellulose acetobutyrate being used with preference.

The elastic matting paste A) contains from 35 to 60% by weight, preferably from 45 to 55% by weight, of organic solvent. Examples of suitable solvents are aromatic compounds with relatively high degrees of substitution, for example solvent naphtha, heavy benzene, various Solvesso grades, various Shellsol grades and Deasol, and relatively high-boiling aliphatic and cycloaliphatic hydrocarbons, for example various white spirits, mineral oil of turpentine, tetralin and decalin and various esters, for example butyl acetate, ethylglycol acetate, butylglycol acetate, ethyldiglycol acetate and the like.

As component a5), the elastic matting paste A) contains from 12 to 25% by weight, preferably from 15 to 22% by weight, of matting agent. Suitable matting agents are commercially available silicic acids, such as pyrogenic silicic acid or silica gels.

In addition, the elastic matting paste A) may if desired contain catalysts, wetting agents and—if desired— other paint auxiliaries and additives. Suitable catalysts are organotin compounds.

Suitable wetting agents are polymer wetting agents based on polyacrylate and/or polyester. Examples of suitable commercial products are Disperbyk 160, Disperbyk 161 (Manufacturer: Byk-Chemie) and Efka 400 and Efka 401 (Manufacturer: Efka).

Other suitable paint auxiliaries and additives are leveling agents such as silicone oils, plasticizers such as phosphates and phthalates, viscosity-controlling additives, UV absorbers, light stabilizers and, if desired, fillers.

The elastic matting paste is prepared in a known manner by the mixing and, if desired, dispersion of the individual components.

The mixing ratio between the organic binder solution and the elastic matting paste (A) is, for example, 1:1.

Shortly before application the organic binder solution is mixed thoroughly with the elastic matting paste and stored in conventional containers until further use. A sieving procedure is then possible employing the high-speed screens which are conventionally used, in order to remove any contaminations, for example dried-on product particles. It is of course also possible to subject the elastic matting paste (A) to a sieving procedure prior to mixing with the binder solution. However, it is preferred to carry out any sieving procedure necessary only after the mixing of the components.

Shortly before application of the coating composition, the mixture of the organic binder solution and of the elastic matting paste (A) is mixed together with the polyisocyanate crosslinking agents (II), with other organic solvents if desired, and with the pulverulent texturing agent.

Suitable pulverulent texturing agents are ground plastics, for example ground polyamide and ground polypropylene. Other suitable examples are ground sand and ground glass. Appropriate commercial polypropylene texturing agents are available under the tradename Propyltex 20S, 50, 100S, 140S, 200S, 200SF and 325S (Manufacturer: Micro Powders, Inc.), Texture 5388, 5380, 5384, 5382 and 5386 (Manufacturer: Shamrock).

Appropriate hollow glass microballs, which can be used as texturing agents, are available under the tradename Scotchlite Glass Bubbles (Manufacturer: 3 M Deutschland GmbH).

The particle size of the texturing agent used is selected in dependence on the intended use. The average particle size of the texturing agent is preferably in the range from 40 to 250 lm.

Conventionally, the texturing agent is employed in a proportion of from 3 to 8% by weight, [lacuna] preferably on the overall weight of the finished coating composition. However, deviations from this are possible in dependence on the intended use.

The amount of polyisocyanate crosslinking agent (II) is chosen such that the number of free hydroxyl groups to the number of isocyanate groups is in the range from 3:1 to 1:3.

If desired, organic solvents are additionally added to the mixture to adjust the coating composition to an appropriate application viscosity. The coating composition is conventionally applied to the plastics substrate by spraying.

The process according to the invention is preferably employed for the refinishing of plastics surfaces on cars, for example bumpers.

The process offers the particular advantage that the coating composition can be subjected to a sieving procedure shortly before application, in order to remove dried-on product particles which could lead to paint defects. Moreover, the addition of the texturing agent as a concentrate offers the advantage of enabling the flexible addition of the appropriate quantity of a texturing agent to the coating composition, depending on the set of requirements.

The invention is illustrated in more detail below on the basis of two exemplary embodiments. In these embodiments parts are by weight unless otherwise indicated.

1. PREPARATION OF THE ELASTIC MATTING PASTES A1) AND A2)

1.1 Preparation of a saturated, hydroxyl group-containing polyester (a1)

By a conventional polyester preparation process, a saturated, hydroxyl group-containing polyester is prepared from 1.0 mol of hexane-1,6-diol, 0.2 mol of trimethylolpropane, 0.65 mol of isophthalic acid, 0.1 mol of phthalic anhydride and 0.25 mol of adipic acid. The polyester has an OH number of 145 mg of KOH/g and an acid number of 1 mg of KOH/g. A 70% solution of the polyester in butyl acetate is prepared.

1.2 Preparation of a hydroxyl group-containing, Cardura-modified acrylate copolymer (a2)

A 4-l stainless steel vessel is charged with:

| | |
|---|---|
| Xylene | 326.65 parts |
| 1-methoxypropyl 2-acetate | 326.65 parts |
| Glycidyl ester of Versatic acid | 190.00 parts |

The mixture is heated to 140° C. and then the following components are metered in from the monomer tank over the course of 3 h:

| | |
|---|---|
| t-butyl acrylate | 200 parts |
| Styrene | 150 parts |
| Hydroxypropyl acrylate | 130 parts |
| Butanediol monoacrylate | 120 parts |
| Methyl methacrylate | 140 parts |
| Acrylic acid | 70 parts |
| Mercaptoethanol | 10 parts |

The following components are metered in from the initiator tank at a uniform rate over the course of 3.5 h:

| | |
|---|---|
| Xylene | 12 parts |
| 1-methoxypropyl 2-acetate | 12 parts |
| Dicumyl peroxide | 6 parts |

The addition of both feeds (monomer and initiator) is simultaneous, and during the polymerization the temperature in the vessel is maintained at 140° C. Subsequently, polymerization is continued for a further 3 h.

Solids content: 60.8%

Viscosity (50%, dpas): 1.90

Acid number: 17.6

Matting pastes A1) and A2) are prepared by mixing and dispersing the following components:

| | A1) | A2) |
|---|---|---|
| OH polyester (a1), based on solids | 18.8 | 19.5 |
| Cardura-modified OH polyacrylate (a2), based on solids | 2.2 | 2.2 |
| Cellulose acetobutyrate | 1.2 | 1.2 |
| Silicic acid (Aerosil 380) | 0.5 | 0.5 |
| Commercial matting agent | 19.0 | 19.0 |
| Light stabilizer | 1.7 | 1.7 |
| Silicone oil | 1.0 | 1.0 |
| Dibutyltin dilaurate | 0.2 | 0.2 |
| Diethylethanolamine | 4.0 | 4.0 |
| Commercial polymer wetting agent | 2.7 | — |
| Xylene | 4.0 | 4.0 |
| Solvent naphtha | 2.8 | 2.8 |

-continued

|  | A1) | A2) |
|---|---|---|
| Butylglycol acetate | 0.1 | 0.1 |
| Butyl acetate 98/100 | 41.8 | 43.8 |

2. EXAMPLE 1 AND 2

100 parts of the OH polyacrylate having the designation 21-1240, "Glassodur-PUR-Acryl-Autolack", black, Manufacturer: BASF Lacke+Farben AG, are thoroughly mixed with 100 parts of the matting paste A1), (Example 1) and A2) (Example 2).

Any dried-on product particles which form are removed by sieving (high-speed screen).

100 parts of the resulting mixtures are thoroughly mixed in each case with 50 parts of the polyisocyanate curing agent "Glassodur-MS-Härter", normal, 929-73 from BASF Lacke+Farben AG and 10 parts of a ground polypropylene (Propyltex 140S, Micro Powders Inc.). Each mixture is adjusted to a spray viscosity of from 20 to 22 sec./DIN 4 cup.

Each mixture is applied to a plastics substrate with a dry film thickness of 25 lm. After a flash-off for 10 min., a further spray pass is carried out (dry film thickness 25 lm). The coated substrate is then dried at 60° C. for 30 minutes.

Two textured coatings are obtained.

We claim:

1. Process for the production of textured coatings on plastic surfaces comprising the steps of:
   A) preparing an elastic matting paste comprising
      a1) from 12 to 25% by weight of a saturated hydroxyl group-containing polyester having a hydroxyl number of from 100 to 160 mg of KOH/g and a number-average molecular weight of from 800 to 2500,
      a2) from 1 to 4% by weight of a hydroxyl group-containing acrylate copolymer polymerized from a mixture of monomers that comprises the reaction product of a glycidyl ester of a carboxylic acid having a tertiary α-carbon atom with one member selected from the group consisting of acrylic acid, methacrylic acid, and mixtures thereof; wherein said acrylate copolymer has a hydroxyl number of from 30 to 250 mg of KOH/g and an acid number of from 0 to 50 mg of KOH/g,
      a3) from 0 to 3% by weight of cellulose ester,
      a4) from 35 to 60% by weight of organic solvent, and
      a5) from 12 to 25% by weight of matting agents,
   the total weight of the elastic matting paste (A) being in each case 100% by weight;
   B) mixing a solution of a hydroxyl group-containing binder and the matting paste together, wherein at least one the matting paste and the binder-matting paste mixture is sieved to remove dried particles;
   C) combining the binder-matting paste mixture with polyisocyanates as crosslinking agents and a pulverulent texturing agent to form a coating composition;
   D) applying the resulting coating composition to a plastic substrate, and
   E) drying the applied coating.

2. Process according to claim 1, wherein the texturing agent is selected from the group consisting of ground plastic, glass and sand.

3. Process according to claim 1 wherein the average particle size of the texturing agent is from 40 to 250 μm.

4. Process according to claim 1, wherein the hydroxyl group-containing binder (I) is an acrylate copolymer having a hydroxyl number of from 30 to 250 mg of KOH/g which is obtained by copolymerization of
   (Ia) Hydroxyalkyl esters of α,β-ethylenically unsaturated carboxylic acids,
   and optionally compounds selected from the group consisting of
   (Ib) vinyl esters of monocarboxylic acids,
   (Ic) ethylenically unsaturated carboxylic acids,
   (Id) other ethylenically unsaturated monomers, and mixtures thereof,
   where component (Ia) comprises, at least in part, reaction products of acrylic acid and/or methacrylic acid with the glycidyl ester of a carboxylic acid having a tertiary A carbon atom.

5. Process according to claim 1, comprising applying a refinish coating composition as defined in claim 1 to plastic surfaces on cars.

6. Process according to claim 1, wherein the coating applied further comprises components selected from the group consisting of catalysts, wetting agents, solvents, and mixtures thereof.

7. Process according to claim 1 wherein the matting paste A) is sieved before being mixed with the solution of the hydroxyl group-containing binder (I).

8. Process according to claim 1 wherein the matting paste A) is sieved after being mixed with the solution of the hydroxyl group-containing binder (I).

9. Process for the production of textured coating compositions based on hydroxyl group-containing binders and polyisocyanate crosslinking agents, using pulverulent texturing agents, wherein the process comprises
   initially mixing a solution of the hydroxyl group containing binder with an elastic matting paste (A) comprising
      a1) from 16 to 21% by weight, of a saturated hydroxyl group-containing polyester having a hydroxyl number of from 100 to 160 mg of KOH/g and a number-average molecular weight of from 800 to 2500,
      a2) from 1.8 to 2.6% by weight, of a hydroxyl group-containing acrylate copolymer polymerized from a mixture of monomers that comprises the reaction product of a glycidyl ester of a carboxylic acid having a tertiary α-carbon atom with one member selected from the group consisting of acrylic acid methacrylic acid, and mixtures thereof: wherein said acrylate copolymer has a hydroxyl number of from 30 to 250 mg of KOH/g and an acid number of from 0 to 50 mg of KOH/g,
      a3) from 0 to 3% by weight of cellulose ester,
      a4) from 45 to 55% by weight, of organic solvent,
      a5) from 15 to 22% by weight, of matting agents
   the total weight of the elastic matting paste (A) being in each case 100% by weight,
   subsequently mixing the binder and matting paste mixture together with polyisocyanate crosslinking agents, and the pulverulent texturing agent,
   followed by applying the resulting coating composition to a plastic substrate, and drying the coating.

* * * * *